United States Patent [19]
Gunter et al.

[11] 3,889,007
[45] June 10, 1975

[54] AQUATIC ANIMAL FOOD COMPOSITION

[75] Inventors: Gordon Gunter; Amaraneni Venkataramaiah, both of Ocean Springs, Miss.

[73] Assignee: Ocean Food Inc., White Stone, Va.

[22] Filed: Jan. 26, 1973

[21] Appl. No.: 327,232

[52] U.S. Cl.............. 426/74; 426/635; 426/646, 426/805
[51] Int. Cl.............................................. A23k 1/00
[58] Field of Search...................... 426/1, 167–170, 426/212, 229, 350, 370, 376, 371, 805, 506; 424/84; 252/316

[56] References Cited
UNITED STATES PATENTS

| | | | |
|---|---|---|---|
| 2,566,549 | 9/1951 | Beckwith | 426/212 |
| 2,605,184 | 7/1952 | Osbourne | 426/212 |
| 3,359,115 | 12/1967 | Lanz | 426/370 |
| 3,529,967 | 9/1970 | Nissen | 426/212 |
| 3,591,389 | 7/1971 | Schneider | 426/167 |
| 3,671,261 | 6/1972 | Ayukawa | 426/212 |
| 3,730,728 | 5/1973 | Patashnik | 426/1 |

FOREIGN PATENTS OR APPLICATIONS

| | | | |
|---|---|---|---|
| 4,641,572 | 8/1971 | Japan | 426/274 |

OTHER PUBLICATIONS

Condensed Chemical Dictionary, Hawley, Van Nortrand, Reinhold, N.Y., 1971.

Primary Examiner—Norman Yudkoff
Assistant Examiner—Hiram H. Bernstein
Attorney, Agent, or Firm—Mason, Fenwick & Lawrence

[57] ABSTRACT

A food composition for aquatic organisms and particularly crustaceans comprising fish meal and a fish extract such as fish press water or fish stick water, fish solubles, fish oil or solvent and a binder that may be one of the organic binders of which gelatin is particularly useful but may also include guar gum, agar agar, CMC, alginate ester and to a lesser extent collagen and pregelatinized potato starch. The food should also include sea water preferably concentrated. Additional ingredients that may be included are vegetable matter of substantially any origin and magnesium and calcium salts. Vitamins suitable for marine creatures may also be added.

20 Claims, No Drawings

3,889,007

AQUATIC ANIMAL FOOD COMPOSITION

BACKGROUND OF THE INVENTION

The dwindling supply of available food from the sea is recognized to be due not only to pollution of the waters of the world but also to the indiscriminate activities of the various nations in fishing the ocean and sea waters to near exhaustion. Marine biologists and other scientists who are concerned about the adequacy of food supply for the increasing population of the world have long considered the desirability of artificially feeding and promoting the growth and health of marine life.

It is recognized that one of the most important problems to be solved in any program of aquaculture relates to the supplying of nutritional requirements for different kinds of commercially important aquatic animals. For instance, shrimp are particularly difficult to nourish adequately and even under controlled laboratory conditions the mortality has been quite high. In the laboratory culture of shrimp, for instance, past methods have produced a mortality rate of up to 20 percent during a 4 week period of time. Foods for culturing shrimp in closed bodies of water have been particularly sought and tested but none has proven particularly successful. Special problems with food have arisen in such aquaculture attempts and it is under closed water conditions that a high mortality rate appears to prevail.

Presently available aquatic animal foods possess a number of undesirable characteristics any one of which can kill the marine creature or at least retard the growth and bring about abnormal health problems. Such foods do not retain the desired shape and consistency under the water for a time of at least several days such that the cultured organisms have ample opportunity to consume it before the food disintegrates, thereby becoming unavailable to the species being fed and also fouling the water and create an unsuitable and unhealthy environment for the desired aquatic organisms.

Numerous prior art efforts to provide a stable marine food are known. For instance, the Schneider U.S. Pat. No. 3,591,389 discloses a fish food composition including fish meal and any one of a number of organic binders with a chelating agent. The purpose of this composition is to provide a powdered fish food substance principally for use in a fish tank.

Another fish food is disclosed in the U.S. Pat. to Otter No. 2,583,964 in which fish meal is bound with gelatin to form a composition which is ground into worm-like particles. It is intended that the composition remain substantially insoluble in the water to prevent leaching of the food into the water and a consequent loss of the availability of the food to the marine creature.

Another approach to the feeding of fish or other aquatic animals is disclosed in Axelrod U.S. Pat. No. 3,361,114 wherein the fish food is combined with an adhesive such as gelatin or gum arabic to retain the integrity of the fish food.

None of the above prior art compositions or techniques provide all of the desirable characteristics of an adequate aquatic animal food, particularly a crustacean food for the reason that all suffer from one of the disadvantageous characteristics of instability in the water, inadequate nutritional components, and the causation of rapid fouling of the water.

SUMMARY OF THE INVENTION

The present invention is a unique discovery of a particular composition of materials and ingredients which provide adequate nutritional components of the diet of aquatic creatures, particularly crustaceans (shrimp, crabs and crawfish) and which will remain stable in the water without disintegration for at least several days and up to a week to enable the shrimp to easily consume the food. Without the normal disintegration there is no pollution of the waters in aquaria or ponds.

The novel composition includes fish meal, a fish extract such as fish press water or fish stick water, fish solubles or other fish oil, sea water preferably concentrated to a high solids content forming an important aspect of the composition since it includes the necessary salts and trace metals, and other ingredients which are important not only for the nutrition of the shrimp or other aquatic animals, but also provide an enhancing effect upon the binding capability of the organic binder used. The binder may be various organic binders, although it is found that gelatin is by far better than any other known organic binder. Other organic binders such as guar gum, agar agar as well as CMC, alginate ester, pregelatinized potato starch and collagen may be used in amounts that will sufficiently bind the combination of the fish meal and the fish extract and sea water to provide stability and integrity for a minimum of several days in the water.

As a further unique facet of the present invention the composition may include any vegetable matter such as may be formed from flour or meal produced from any crop vegetable such as wheat, alfalfa, corn, potato, rice, etc., cellulose in a form that may be obtained from wood pulp, grasses, plant leaves and waste vegetable matter such as rice or soy bean hulls, corn cobs, etc., and in fact algal matter may be used. In order to assist the shrimp and other crustaceans in maintaining a characteristically hard shell, magnesium and calcium salts may be added in the form of a chloride, carbonate, nitrate, sulfate, lactate, phosphate or the like, the anion being derived from any acid that is not harmful to living organisms. Vitamins of various types may also be included.

DESCRIPTION OF THE INVENTION

The composition of the present invention is composed principally of the essential four ingredients of fish meal, fish extracts, sea water and an organic binder. The vegetable matter and the magnesium and calcium salts though not critical are extremely desirable for fresh water crustaceans for purposes of shell formation after moulting and for unforeseen advantages.

The fish meal is an important ingredient of the composition since it provides the bulk of the protein found important to sustain the health of the aquatic animals. The fish meal is a well known commercial product produced from fish or fish scrap. The fish meal may be produced by cooking the fish or fish scrap including the heads and tails and viscera under pressure for a period of time of 5 to 20 minutes after which the cooked fish is pressed. The oil and water that is removed is generally referred to as "fish press water" while the pressed cake which may contain about 50 percent moisture is dried to form the well known fish meal. The fish press water may contain solids up to 10 percent and includes fish oil mixed with the solids. The fish press water contains solids that are mainly insoluble but includes some soluble proteins. As is well known the fish press water may be heated to a temperature of about 190°F. from which the residual oil may be removed by a centrifuge. The remaining aqueous portion contains oil and some insoluble protein particles as well as some soluble proteins is referred to as "fish stick water." The aqueous portion or fish stick water may be acidified to a pH between 4 and 5 and then evaporated to a solids content of about 50 percent. This concentrate is known as condensed fish solubles.

The fish meal containing a high proportion of protein is the staple nutrient constituent of the composition of the present invention and all the ingredients of the composition are based upon the amount of fish meal that is included in the ultimate product. It has been found that the fish meal must be supplemented with a fish extract to provide the fishy taste and flavor or aroma that is recognized by and attracts the aquatic animals. The term "fish extract," as used throughout the specification of claims, is intended to include fish press water,, fish stick water, fish solubles or fish oil any one of which would have the characteristic odor, taste and texture of a fishy material. The fish extract may be present broadly in the amount of 25 to 400 parts per 1,000 parts of fish meal while preferably the amount should be 75 to 200 parts and ideally 80 to 100 parts to produce the most acceptable product.

One of the significant and important aspects of the present composition is the inclusion of sea water as a means of not only providing the liquid necessary to form the product but importantly to provide the many nutrients present in the sea such as the metal ions and various insoluble and soluble minerals and salts which contribute significantly to the health and growth of the aquatic animals. The sea water is also important for its enhancement of the binding effect when the organic binder is incorporated into the composition. Sea water having a normal range of salinity and approximate solid content of about 3-4 percent is preferably, though not necessarily, concentrated to a solid content of approximately 4 to 15 percent. Whether concentrated or not the amount of sea water in its broadest aspect should be 100 to 400 parts per 1,000 parts of fish meal preferably 150 to 250 parts. The concentration of the sea water may more preferably range from 6 to 10 percent solids and ideally from 8 to 8 ½ percent solids. The higher concentration of the sea water may be obtained by refrigerating offshore sea water and collecting the bottom fraction in several cycles or the sea water may be simply evaporated to the desired concentration. It is not essential that the sea water be concentrated though sea water with a higher solid content necessarily provides a higher percentage source of the various ions and trace metals required for the aquatic creatures as well as assisting and preserving the marine food for up to several months when combined with the organic binder.

The binder found useful in accordance with the present invention includes substantially any organic binder insoluble in sea water at temperatures of about 10°-33°C. The amount of the binder may be broadly 10 to 200 parts of the organic binder per 1,000 parts of fish meal. Preferably the amount may be 15 to 100 parts and most ideally 20 to 60 parts. The amount of the binder is not critical to the invention as it is only important to incorporate sufficient binder to enable the final product to withstand the leaching and disintegration in water with a temperature range of 10°-33°C. for at least about 2 days.

While substantially any organic binder has been found to produce results among which may be guar gum, agar agar, alginate ester, CMC, collagen and pregelatinized potato starch, it has been found that gelatin is substantially superior as a binding agent. It is theorized that there is an interaction between the gelatin and the metal ions and other salts in the sea water, particularly when concentrated as preferred. The gelatin also appears to provide a thorough coating of the particles of fish meal to provide greater stability in the water. It is recognized that previous compositions utilized gelatin as a binder for the marine food but tests and reports from users of such compositions indicate a lack of success of such products providing the stability desired. The thorough mixing of the gelatin in proportions to adequately coat the particles of the composition and the incorporation of the sea water are believed to provide a synergistic action with the gelatin to produce unexpected stability in the water.

The aquatic animal food may also include a vegetable matter in amounts from 25 to 200 parts per 1,000 parts of fish meal, preferably 25 to 100 parts, and preferably 40 to 60 parts per 1,000 parts of the fish meal. The vegetable matter may be a wide source of vegetable material and may include for instance: cellulose that may be obtained from wood pulp; flour or meal such as obtained from any of the common crops such as wheat, alfalfa, corn, potatoes, or rice; any of the well known grasses as Spartina; waste vegetable matter such as rice or soy bean hulls, corn cobs, plant leaves or cuttings and algal matter.

The purpose of the vegetable matter is to improve the protein conversion ratio since it appears to unexpectedly produce a higher protein conversion ratio among omnivores such as shrimp. For the purposes of the aquaculture of shrimp or other aquatic creatures for the present invention it is intended that the food be utilized in a closed body of water. In this closed inaccessible body of water it has been discovered that the various trace elements present in the sea water portion of the present composition are important and in addition it is believed desirable though not absolutely essential, that calcium and magnesium salts be added to assist the shrimp or aquatic organisms to compensate for the loss of these vital elements from the periodic moulting during which the creatures lose considerable amounts of calcium and magnesium. It has been recognized for instance, the shrimp raised in an enclosed pond tend to exhibit the presence of a soft shell condition or a lack of calcification of the shell. These salts are thus a desirable ingredient so that the calcium and magnesium ions that are lost during the natural moulting process may be replenished.

The magnesium salt may be present in the amount of 2 to 100 parts per 1,000 parts of fish meal preferably 5 to 50 parts and more preferably 10 to 30 parts. The calcium salts may be present in the amount between 10 and 150 parts per 1,000 parts of fish meal preferably 25 to 100 parts and more preferably 40 to 60 parts of the calcium salt per 1,000 parts of fish meal. The anion forming the salt may be derived from any compound which does not produce a toxic effect on living animals. Preferably to avoid any possible question of pollution of the waters the anions should be non-toxic. Among those that are acceptable, a partial listing includes chloride, carbonate, nitrate, sulfate, lactate, oxide, phosphate, etc. The lactate may have some inherent value as a pure food and others as a mineral food.

Entirely optional would be the addition of various well known crude multi-vitamin mixes commonly used in animal feeds and the identity of the vitamins and the amount is no way critical and would depend entirely upon the type of organism to be fed.

It is preferable that the composition of the present invention be utilized in the form of pellets or elongated tubular shapes about the size of macaroni. The form and shape of the food composition as added to the water during aquaculture or maintenance in aquaria is not critical.

Procedure adapted in the present invention is as follows: Finely chopped vegetable matter in the form of cellulose and in the amount of 50 grams along with 2 grams of magnesium oxide and 50 grams of calcium carbonate or calcium lactate are added to 1,000 grams of fish meal. The ingredients are mixed until the whole mixture is homogeneous. A hundred grams of fish stick water and 300 ml. of sea water concentrated to 80 to 85 parts per 1,000 are then added to the mixture in small quantites. Simultaneous stirring of the whole mass in a mixer for about 10 minutes produces a hard dough. The dough is compacted by pressing through an extruder a long and slender macaroni or noodle shape of anywhere from ⅛ to ¼ inch in diameter. In the process of compacting and extrusion the dough becomes homogeneous. Instead of extrusion it has been found that any adequate mixing technique that provides a homogeneous mixture is adequate.

The compacted homogeneous dough is placed in a mixer and a gelatin solution composed of 15 grams of gelatin dissolved in 150 ml. of fresh water or sea water at 100°C. for 30 minutes is added in small quantities while mixing vigorously with the beater. The mixing process is continued until the gelatin solution is uniformly distributed in the dough. After thorough mixing, the gelatin is found to coat all of the particles thus enabling the final food product to withstand leaching from the water.

After the dough is mixed with the gelatin it is pressed into pellets within 30 minutes. Further delay will harden the dough and the pellet making process becomes impossible. Any suitable pellet making machine or suitable pellet size will be adequate. Instead of a given pellet size and shape, the dough when mixed with gelatin may be formed from an extrusion apparatus in the form of macaroni shape which may be broken or crumbled into pieces. After formation the pellets are hardened by drying. A quick hardening allows the pellets to retain their shape and is accomplished by exposing the pellets to a temperature of about 23°C. for about 1 hour. In the drying process the excess water pressed into the dough is evaporated. Slow drying can be performed by exposing the pellets to air at a temperature of 26°–27°C. However, exposure of pellets to higher temperatures around 35°C. seems to interfere with the binding properties. The drying should be completed in 6 hours at room temperature (26°–27°C.). Properly dried pellets can be stored up to 1 year.

Tests reveal that the pellets retain their shape in a wide salinity concentration ranging from fresh water to full strength sea water at temperatures between 10° and 33°C. The salinity and temperature ranges represent the normal aquaculture ranges encountered. The pellets do not soften or swell in water for a couple of days at least and do not even begin to disintegrate until after the passage of several days.

An aquatic food composition corresponding to the present invention may also be made similar to the above example except for the ommission of vegetable matter and the magnesium and calcium salts.

The food pellets are readily accepted by various sizes of shrimp from postlarval stage to adults. Fishes such as fresh water catfish, croakers, goldfish and other varieties accept it as food and are grown in healthy condition. When the pellets are fed to brown shrimp, *Penaeus aztecus*, they can be grown from 9–10 mm. postlarvae to adult of 115 mm. size. Growth equal to shrimp in natural populations was attained exclusively with the dried food under laboratory conditions for the first time in history. The shrimp were healthy and active throughout. This means that the food meets the full nutritional requirements of a fast growing, natural shrimp population with low mortality. Water in which shrimp are grown using this food for three months can be continued in use with no ill effects. No other food has these qualities so far as we know.

The aquatic food was found to retain its integrity for several days allowing the marine creatures to hold it and eat it even after the passage of several days, thus wasting of food is minimized and the possibility for disintegration is lessened. Since the food does not dissolve in water over wide salinity and temperature range the hazard of accumulation of nitrates or phosphates or other undesirable anions which would result in oxygen depletion problems in pond culture are all maintained at a minimum. These characteristics are often found wanting in previous compositions.

We claim:

1. An aquatic animal food comprising: fish meal, a fish extract in an amount sufficient to impart a fish flavor to said meal, sea water in an amount of 150–400 parts per 1,000 parts of fish meal, and an organic binder, non-toxic to marine life, in an amount sufficient to form particles capable of withstanding disintegration or leaching from sea water of varying natural salinity and a temperature range of 10°–33°C. for several days.

2. The aquatic food of claim 1 wherein, said sea water is concentrated to 4–15 percent solids.

3. The aquatic food of claim 1 wherein, said binder is present in the amount of 10–200 parts per 1,000 parts of fish meal.

4. The aquatic food of claim 1 wherein, said fish extract is present in the amount of 25–400 parts per 1,000 parts of fish meal.

5. The aquatic food of claim 1 wherein, said sea water is concentrated to 6–10 percent solids.

6. The aquatic food of claim 1 wherein, said sea water is concentrated to 8–8.5 percent solids.

7. The aquatic food of claim 1 wherein, said binder is gelatin.

8. The aquatic food of claim 1 wherein, said binder is selected from the group consisting of collagen, pregelatinized potato starch, agar agar, CMC, alginate ester and guar gum.

9. The aquatic food of claim 1, including 25–200 parts of vegetable matter per 1,000 parts of fish meal.

10. The aquatic food of claim 1, including vegetable matter selected from the group consisting of cellulose, meal or flour from vegetable crops, grass waste vegetable matter, algal matter, plant cuttings and leaves.

11. The aquatic food of claim 1, including magnesium and calcium salts.

12. The aquatic food of claim 1, including 2–10 parts per 1,000 parts of fish meal of a magnesium salt.

13. The aquatic food of claim 1, including 10–150 parts per 1,000 parts of fish meal of a calcium salt.

14. The aquatic food of claim 1, wherein, the fish extract is selected from the group consisting of fish stick water, fish press water, fish solubles, fish oil.

15. The aquatic food of claim 7 wherein, said binder is present in the amount of 10–200 parts per 1,000 parts of fish meal.

16. The aquatic food of claim 7 wherein, said fish extract is present in the amount of 25–400 parts per 1,000 parts of fish meal.

17. The aquatic food of claim 1 wherein, said sea water is concentrated to 4–15 percent solids, said binder is gelatin, said binder is present in the amount of 10–200 parts per 1,000 parts of fish meal, said fish extract is present in the amount of 25–400 parts per 1,000 parts of fish meal.

18. The aquatic food of claim 17 including vegetable matter selected from the group consisting of cellulose, meal or flour from crop vegetables, grass, waste vegetable matter, algal matter, plant cuttings and leaves, and including magnesium and calcium salts.

19. The aquatic food of claim 1 wherein, said sea water is concentrated to 4–15 percent solids, said binder is gelatin and is present in the amount of 10–200 parts per 1,000 parts of fish meal, said fish extract is present in the amount of 25–400 parts per 1,000 parts of fish meal and including 25–200 parts of vegetable matter per 1,000 parts of fish meal and magnesium and calcium salts.

20. The aquatic food of claim 1 wherein, said sea water is concentrated to 4–15 percent solids, said binder is gelatin and is present in the amount of 10–200 parts per 1,000 parts of fish meal, the fish extract is selected from the group consisting of fish stick water, fish press water, fish solubles, fish oil, said fish extract being present in the amount of 25–400 parts per 1,000 parts of fish meal and including 25–200 parts of vegetable matter per 1,000 parts of fish meal and magnesium and calcium salts.

* * * * *